United States Patent [19]

Baba

[11] 4,452,353

[45] Jun. 5, 1984

[54] APPARATUS FOR SEPARATING STACKS PLACED ON STACK FEED CONVEYOR

[75] Inventor: Kiyokazu Baba, Komatsu, Japan

[73] Assignee: Kabushiki Kaisha Komatsu Seisakusho, Tokyo, Japan

[21] Appl. No.: 421,335

[22] Filed: Sep. 22, 1982

[30] Foreign Application Priority Data

Oct. 12, 1981 [JP] Japan .................. 56-150020[U]

[51] Int. Cl.³ ............................................ B65G 47/29
[52] U.S. Cl. ................................... 198/492; 198/425; 414/112; 414/330
[58] Field of Search ....................... 414/112, 114, 330; 198/425, 459, 491, 492

[56] References Cited

U.S. PATENT DOCUMENTS

| | | | |
|---|---|---|---|
| 1,459,722 | 6/1923 | Erslev | 198/491 X |
| 2,954,881 | 10/1960 | Hopton et al. | 414/330 |
| 3,217,859 | 11/1965 | Bartlo et al. | 198/425 |
| 3,752,295 | 8/1973 | Hubbell et al. | 198/491 X |
| 4,051,958 | 10/1977 | Richardson et al. | 414/112 |

FOREIGN PATENT DOCUMENTS 54183773 6/1978 Japan.

Primary Examiner—Leslie J. Paperner
Attorney, Agent, or Firm—Armstrong, Nikaido, Marmelstein & Kubovcik

[57] ABSTRACT

An apparatus for separating a stack consisting of, for example, a multiplicity of blank materials piled one on another from the remaining plurality of stacks placed on a stack feed conveyor. The stack separating apparatus is arranged at an intermediate portion of the stack feed conveyor so as to separate a stack from the remaining stacks in the course of conveyance, and then to convey, in turn, the separated stack to a predetermined location under a vacuum cup device of a destacker.

5 Claims, 4 Drawing Figures

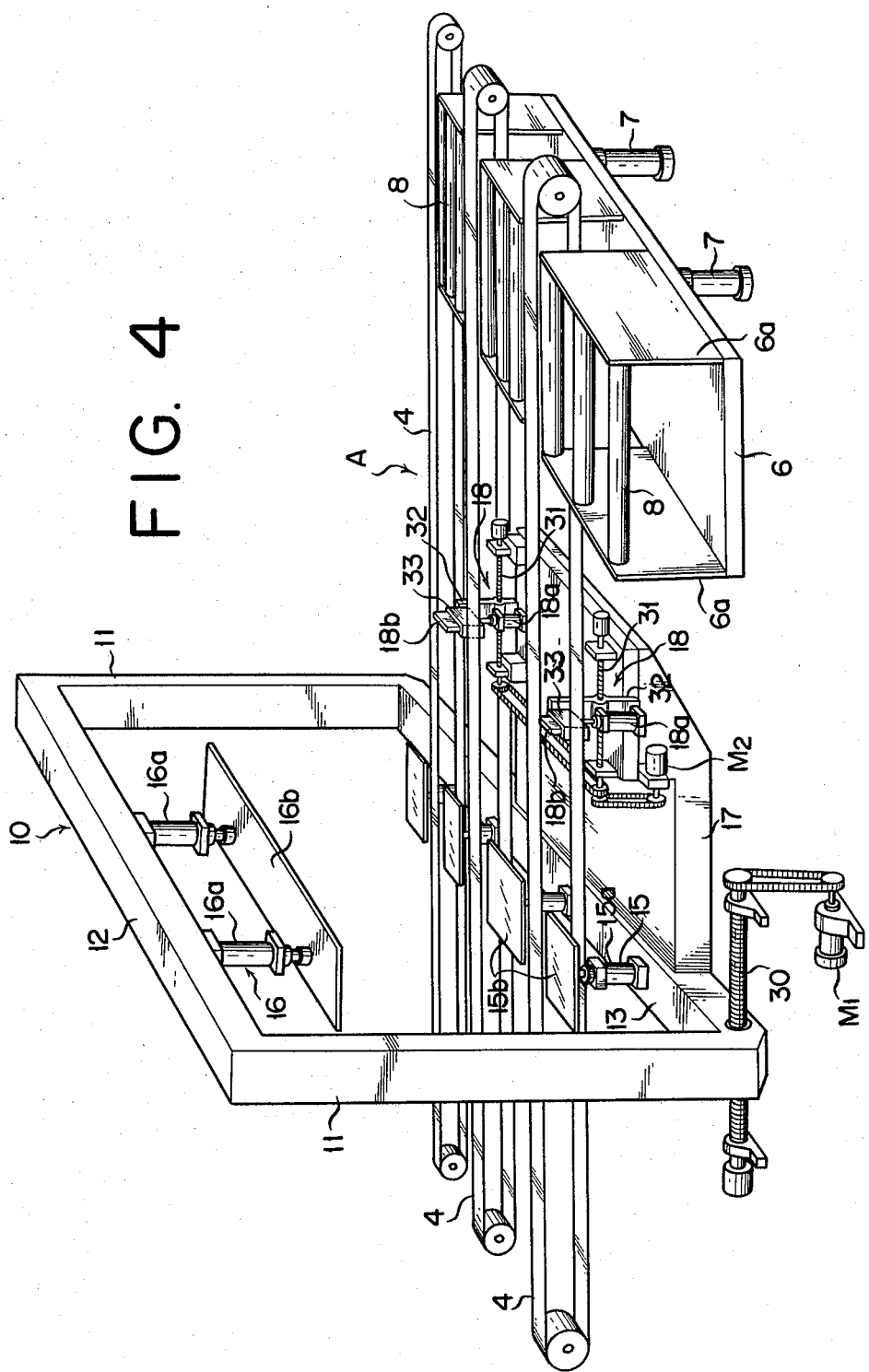

APPARATUS FOR SEPARATING STACKS PLACED ON STACK FEED CONVEYOR

BACKGROUND OF THE INVENTION

1. Field of the Invention

This invention relates to an apparatus for separating a stack from the remaining plurality of stacks placed on a stack feed conveyor when the stacks each including, for example, a multiplicity of blank materials piled one on another are conveyed by means of a stack feed conveyor to a location under a vacuum cup device of a destacker.

2. Description of the Prior Art

It has been not preferrable to place and convey a plurality of stacks on a stack feed conveyor, because it results in continuous conveyance of the plurality of stacks on the conveyor and therefore various troubles tend to occur when attracting and picking up them by means of a vacuum cup.

For this reason, it has so far been employed a method of conveying one stack placed on a stack feed conveyor. However, this method requires a stack to be placed on the stack feed conveyor each time and such an operation is very troublesome.

SUMMARY OF THE INVENTION

The present invention has been contemplated in view of the above-mentioned circumstances, and has for its object to provide a stack separating apparatus arranged so that one of a plurality of stacks placed on a stack feed conveyor can be separated and conveyed.

According to the present invention, in order to achieve the above mentioned object, there is provided a stack separating apparatus characterized by that it comprises a stack lifter means located under the intermediate portion of a stack feed conveyor in the direction of conveyance and adapted to lift a stack from the conveyor; a frame means located in front of said stack lifter means transversely to the stack feed conveyor in a manner of surrounding the latter, said frame means being arranged to be freely movable in the direction of conveyance; front stoppers and lower holder means mounted on a lower frame member of said frame means so as to stand in the clearance between respective unit belts adjacent to each other of a plurality of unit belts forming said stack feed conveyor, said front stoppers and lower holder means being arranged to be vertically movable freely relative to said stack feed conveyor; and upper holder means mounted on an upper frame member of said frame means opposite to said lower holder means and arranged to be vertically movable freely, wherein a plurality of stacks to be conveyed by said stack feed conveyor are first stopped by means of said front stoppers, and subsequently the foremost stack in the direction of conveyance is clamped in turn by means of said upper and lower holder means and then separated from the remaining stacks.

BRIEF DESCRIPTION OF THE DRAWINGS

The above and other objects, features and advantages of the present invention will become apparent from the following description taken in conjunction with the accompanying drawings in which:

FIG. 4 is a detailed perspective view showing the principal part of another embodiment of the present invention.

DETAILED DESCRIPTION OF THE PREFERRED EMBODIMENTS

Figure 1:
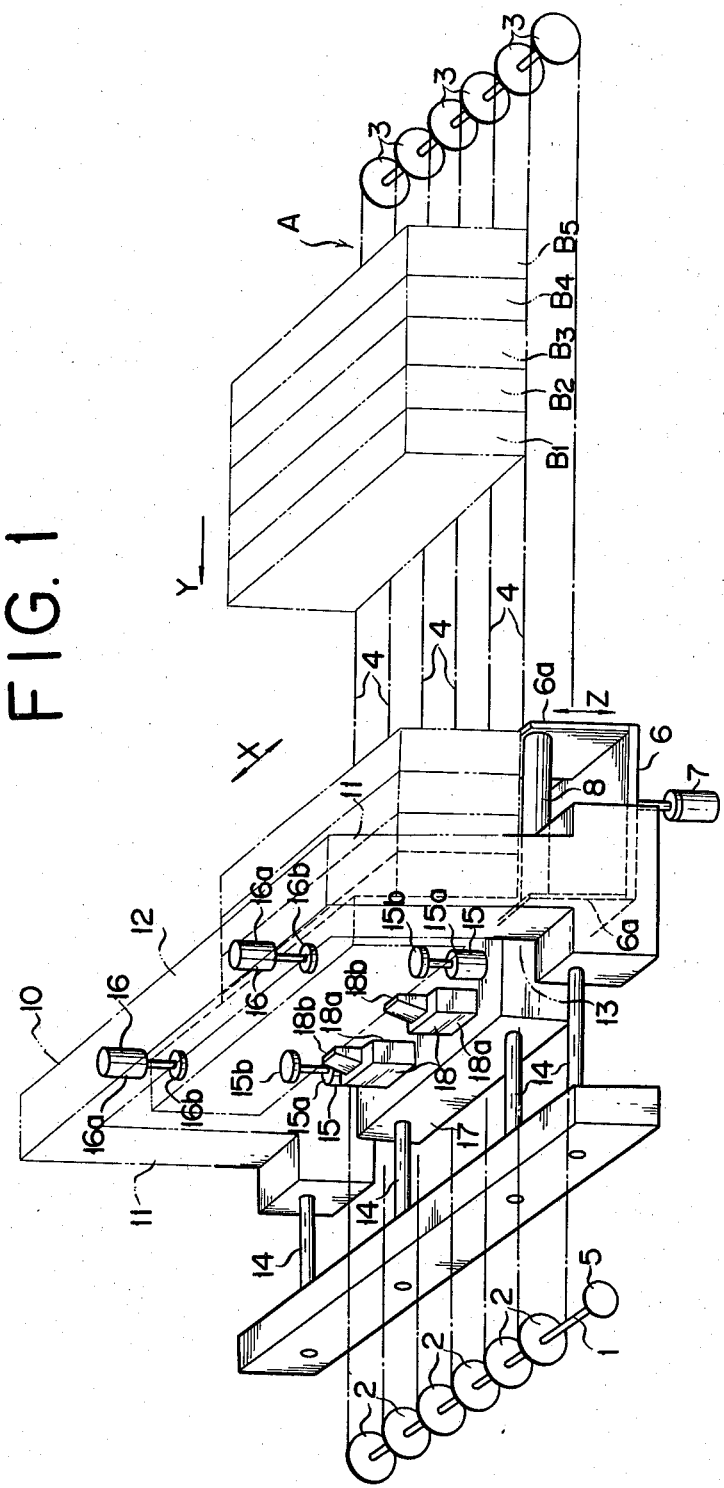
FIG. 1 is an overall schematic perspective view showing an embodiment of the present invention.
Figure 2:
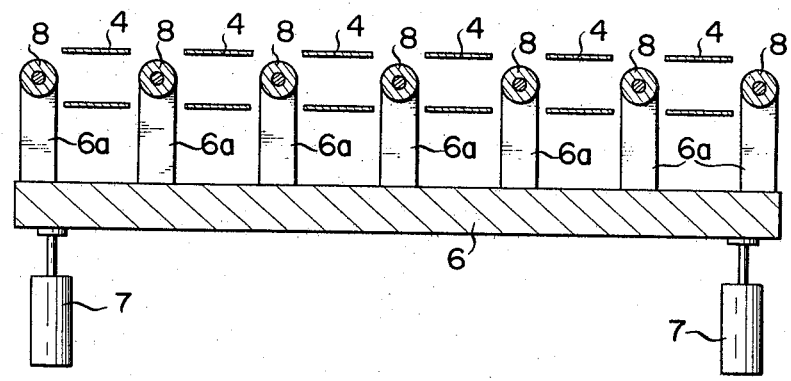
FIGS. 2 and 3 are vertical sectional views of the principal part of the embodiment shown in FIG. 1.
Figure 3:
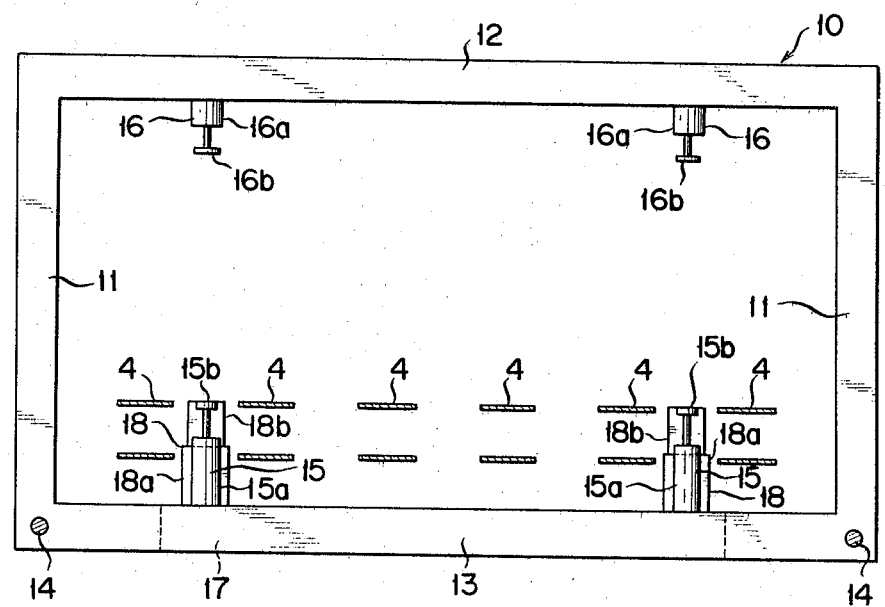

A stack feed conveyor "A" comprises a plurality of unit belts 4 extending or wound around drive rollers 2 mounted on a drive shaft 1 at equal space intervals and driven rollers 3, said drive shaft 1 being connected to a motor 5.

A roller attachment frame 6 is located at a position below the intermediate portion of the above-mentioned stack feed conveyor "A" in the direction of conveyance shown by arrow "Y" so that the frame 6 may be freely moved by means of a lift cylinder 7 in the vertical direction shown by arrow "Z". On both sides of the roller attachment frame 6 in the direction of conveyance and in each clearance between respective pair of belts 4 adjacent to each other there are provided a plurality of upright pieces 6a fixedly secured to the frame 6 which are equally spaced apart in the direction "X" extending at right angles to the direction of conveyance "Y". Mounted between the upright pieces 6a, 6a located oppositely to each other in the direction of conveyance are a plurality of rollers 8 which are carried rotatably in the direction at right angles to the direction of conveyance.

In the above-mentioned arrangement, when the roller attachment frame 6 is moved upwards by means of the lift cylinder 7, each roller 8 is projected to a position higher than each unit belt 4, whilst when the frame 6 is moved downwards, each roller 8 is lowered to a position lower than each unit belt 4.

A frame 10 is mounted on the delivery side of the aforementioned roller attachment frame 6 so as to straddle the stack feed conveyor "A". The frame 10 is of a rectangular form comprised of longitudinal side members 11, 11, an upper or ceiling frame member 12 and a lower or bottom frame member 13, and is arranged to be moved freely along guide rods 14 and in the direction of conveyance.

The above-mentioned lower frame member 13 is provided with a pair of lower holders 15, 15, each of which is located at the position lower than the unit belts 4, 4 adjacent to each other and in the clearance therebetween. Whilst, the upper frame member 12 is provided with a pair of upper holders 16, 16 which are located opposite to the pair of lower holders 15, 15. Each of the lower holders 15 comprises a retainer plate 15b adapted to be moved vertically by means of a cylinder 15a, whilst each of the upper holders 16 comprises a retainer plate 16b also adapted to be moved vertically by means of a cylinder 16a.

The aforementioned lower frame member 13 is formed with a bracket 17 as an integral unit thereof on the delivery side. The bracket 17 comprises a pair of front stoppers 18, 18 located in the clearance between the respective pair of unit belts 4, 4 adjacent to each other. Each of the front stoppers 18, 18 comprises a stopper piece 18b adapted to be moved vertically by means of a cylinder 18a.

Further, the aforementioned frame 10 is arranged to be reciprocally moved by means of an actuating cylinder, etc. along the guide rods 14.

A plurality of stacks $B_1$, $B_2$, $B_3$, $B_4$ and $B_5$ are placed on the stack feed conveyor and conveyed by means of the motor 5, when energized, in the direction shown by arrow "Y", and the stopper pieces 18b, 18b of the front stoppers 18, 18 are allowed to project out higher than the unit belts 4 by the action of the respective cylinders 18a, 18a.

As a result, the foremost stack $B_1$ is allowed to abut against the stopper pieces 18b, 18b and the motor 5 will stop thereby stopping the stack feed conveyor "A".

The arrangement is made such that the upper and lower holders 16 and 15 are previously positioned to occupy their positions oppositely to the foremost stack $B_1$ at that time.

Under such a condition, the retainer plates 15b and 16b are moved upwards and downwards by means of the cylinders 15a and 16a of the lower and upper holders 15 and 16, respectively, so as to urge the retainer plates 15b and 16b on the lower and upper surfaces of the foremost stack $B_1$ to thereby clamp the latter by means of the lower and upper holders 15 and 16.

After that, the stopper pieces 18b are moved downwards by the action of the cylinders 18a of the front stoppers 18, and also the frame 10 is moved in the direction of conveyance "Y", so as to move only the foremost stack $B_1$ in the direction of conveyance and separate the stack $B_1$ from the remaining stacks $B_2$, $B_3$, $B_4$ and $B_5$.

Under such a condition, the retainer plates 15b and 16b are allowed to move downwards and upwards by the action of the cylinders 15a and 16a of the lower and upper holders 15 and 16, respectively, so as to release the foremost stack $B_1$ thus clamped, and then the stack $B_1$ is placed on the stack feed conveyor "A". At the same time, the lift cylinders 7 are raised so as to move the rollers 8 higher than the unit belts 4 and lift the remaining stacks $B_2$ to $B_5$ higher than the level of the stack feed conveyor "A".

Thereafter, the motor 5 is again energized or driven to allow only the foremost stack $B_1$ to be conveyed by means of the stack feed conveyor "A" to a designated location.

At that time, the remaining stacks $B_2$ to $B_5$ rest on the rollers 8, and therefore they are not conveyed and stand ready for the opportunity.

Subsequently, the lift cylinders 7, 7 are lowered so as to lower the rollers 8 and place the remaining stacks $B_2$ to $B_5$ on the stack feed conveyor "A", and then the same operation as mentioned above will be repeated.

By so doing, the plurality of stacks $B_1$ to $B_5$ are separated in turn one by one and conveyed to a predetermined location.

FIG. 4 is a detailed perspective view of another embodiment of the present invention wherein a frame 10 is arranged to be moved in the direction of conveyance by means of a screw rod 30 threadably connected therewith and adapted to be driven by a motor $M_1$ and a pair of holders 16, 16 have a common retainer plate 16b formed as an integral unit thereof.

Further, threadably engaged with each of screw rod 31 rotatably carried by a bracket 17 is a movable member 32 which has a cylinder 18a and a stopper piece 18b fitted thereto. The stopper piece 18b is vertically movable along a guide 33, and the screw rod 31 is arranged to be driven by means of a motor $M_2$.

It is to be understood that the foregoing description is merely illustrative of preferred embodiment of the invention, and that the scope of the invention is not to be limited thereto, but is to be determined by the scope of the appended claim.

I claim:

1. A stack separating apparatus comprising: a stack lifter means located under the intermediate portion of a stack feed conveyor in the direction of conveyance and adapted to lift a stack from the conveyor; a frame means located in front of said stack lifter means transversely to said stack feed conveyor in a manner of surrounding the latter, said frame means being arranged to be freely movable in the direction of conveyance; front stoppers and lower holder means mounted on a lower frame member of said frame means so as to stand in the clearance between respective unit belts adjacent to each other of a plurality of unit belts forming said stack feed conveyor, said front stoppers and lower holder means being arranged to be vertically movable freely relative of said stack feed conveyor; and upper holder means mounted on an upper frame of said frame means opposite to said lower holder means and arranged to be vertically movable freely, wherein a plurality of stacks to be conveyed by said stack feed conveyor are first stopped by means of said front stoppers, and subsequently the foremost stack in the direction of conveyance is clamped in turn by means of said upper and lower holder means and then separated from the remaining stacks.

2. A stack separating apparatus as claimed in claim 1, wherein said frame means is moved in the direction of conveyance by means of an actuating cylinder means.

3. A stack separating apparatus as claimed in claim 1, wherein said frame means is moved in the direction of conveyance by means of at least a screw rod threadably engaged with said frame means and adapted to be driven by a motor.

4. A stack separating apparatus as claimed in claim 1, wherein said front stoppers are movable in the direction of conveyance by means of screw rods threadably engaged through movable members with said front stoppers, respectively, and adapted to be driven by a motor.

5. A stack separating apparatus as claimed in claim 1, wherein said upper holder means comprises a unit retainer plate.

* * * * *